(12) United States Patent
Someya et al.

(10) Patent No.: US 8,431,173 B2
(45) Date of Patent: Apr. 30, 2013

(54) PROCESSED TOMATOES, DRY TOMATOES AND METHOD OF PRODUCING THE SAME

(75) Inventors: Masataka Someya, Nasushiobara (JP); Takahiro Kawana, Nasushiobara (JP); Katsutoshi Hosoi, Nasushiobara (JP)

(73) Assignee: Kagome Co., Ltd., Nagoya-shi, Aichi (JP)

( * ) Notice: Subject to any disclaimer, the term of this patent is extended or adjusted under 35 U.S.C. 154(b) by 188 days.

(21) Appl. No.: 12/735,763

(22) PCT Filed: Feb. 19, 2009

(86) PCT No.: PCT/JP2009/052857
§ 371 (c)(1),
(2), (4) Date: Aug. 16, 2010

(87) PCT Pub. No.: WO2009/104666
PCT Pub. Date: Aug. 27, 2009

(65) Prior Publication Data
US 2010/0310737 A1 Dec. 9, 2010

(30) Foreign Application Priority Data
Feb. 19, 2008 (JP) ................. P2008-037749

(51) Int. Cl.
*A23B 7/015* (2006.01)
(52) U.S. Cl.
USPC ........... 426/240; 426/640; 426/482; 426/518; 219/121.71
(58) Field of Classification Search .................. 426/240, 426/248, 640, 481, 482, 518; 219/121.6, 219/121, 67–67.71; 99/584
See application file for complete search history.

(56) References Cited

U.S. PATENT DOCUMENTS

| 4,331,691 A | * | 5/1982 | Poovaiah et al. | 426/302 |
| 4,358,467 A | * | 11/1982 | Patel | 426/237 |

(Continued)

FOREIGN PATENT DOCUMENTS

| CN | 101151977 A | 4/2008 |
| EP | 0 319 240 A2 | 6/1989 |

(Continued)

OTHER PUBLICATIONS

Notification of Transmittal of the International Search Report and the Written Opinion of the International Searching Authority, or the Declaration (PCT/ISA/220) and Written Opinion of the International Searching Authority (PCT/ISA/237) (in Japanese), dated Mar. 17, 2009, issued in PCT/JP2009/052857.

(Continued)

*Primary Examiner* — Drew E Becker
(74) *Attorney, Agent, or Firm* — Hamilton, Brook, Smith & Reynolds, P.C.

(57) ABSTRACT

Disclosed are: dry tomatoes having excellent texture, flavor, and appearance, as well as being readily producible; and processed tomatoes suitable as a raw material for producing such dry tomatoes. Specifically disclosed are: a processed tomato wherein a portion of a cuticular layer, together with or without a portion of an epidermal tissue, has been removed; a dry tomato produced by drying the processed tomato; a method of producing a processed tomato comprising removing a portion of a cuticular layer, together with or without a portion of an epidermal tissue, by laser irradiation on a tomato surface; a method of producing a processed tomato comprising removing a portion of a cuticular layer of a tomato, the main body of which is not cut; a method of producing a processed tomato comprising removing a portion of an epidermal tissue together with a portion of a cuticular layer of a tomato, the main body of which is not cut, while preventing leakage of fruit juice to the surface; and a method of producing a dry tomato comprising producing a processed tomato by the preceding production method, and thereafter drying the processed tomato.

17 Claims, 3 Drawing Sheets

U.S. PATENT DOCUMENTS

| | | | | | |
|---|---|---|---|---|---|
| 4,839,181 | A | * | 6/1989 | MacMurray et al. | 426/237 |
| 5,196,222 | A | * | 3/1993 | Kirk | 426/482 |
| 5,545,422 | A | * | 8/1996 | Davies et al. | 426/482 |
| 5,897,797 | A | * | 4/1999 | Drouillard et al. | 219/121.68 |
| 7,625,592 | B1 | * | 12/2009 | Sinha et al. | 426/639 |
| 7,629,011 | B2 | * | 12/2009 | Suasin et al. | 426/482 |
| 2003/0170372 | A1 | * | 9/2003 | May | 426/640 |
| 2011/0091620 | A1 | * | 4/2011 | Han | 426/456 |

FOREIGN PATENT DOCUMENTS

| | | |
|---|---|---|
| FR | 2682856 A1 | 4/1993 |
| JP | A-56-109547 | 8/1981 |
| JP | A-58-081735 | 5/1983 |
| JP | 02-049541 | 2/1990 |
| JP | 2001-000131 | 1/2001 |
| JP | A-2001-178434 | 7/2001 |
| JP | A-2003-125725 | 5/2003 |
| JP | A-2007-129997 | 5/2007 |
| WO | WO 03/051162 A1 | 6/2003 |

OTHER PUBLICATIONS

International Search Report (PCT/ISA/210) (in Japanese and in English), dated Mar. 17, 2009, issued in PCT/JP2009/052857.

Edited by Shufu no Tomosha, Ryori Shokuzai Daijiten, Shufunotomo Co., Ltd., Jul. 27, 1996, pp. 583-584 (in Japanese).

International Preliminary Report on Patentability in Japanese and English translation, in International Application No. PCT/JP2009/052857, 9 pages, mailed Oct. 5, 2010.

EPO Communication, Supplementary European Search Report and Annex to the European Search Report on European Application No. 09 711 734.5, 6 pages, mailed Aug. 17, 2011.

English translation of Notice of Reasons for Rejection mailed Jan. 29, 2013 in Japanese application No. 2009-554360.

* cited by examiner

PROCESSED TOMATOES, DRY TOMATOES AND METHOD OF PRODUCING THE SAME

RELATED APPLICATIONS

This application is the U.S. National Stage of International Application No. PCT/JP2009/052857, filed Feb. 19, 2009, which designates the U.S., published in Japanese, and claims priority under 35 U.S.C. §§119 or 365(c) to Japanese Application No. 2008-037749, filed Feb. 19, 2008. The entire teachings of the above-applications are incorporated herein by reference.

TECHNICAL FIELD

The present invention relates to processed tomatoes and dry tomatoes having excellent appearance and quality as well as being suitable for use in food products, and methods of producing the same.

BACKGROUND ART

In recent years, lifestyle and eating habits are more diversified, which leads to increasing demands for long term storable foods and various kinds of foods pleasing to the palate and the eyes. Of these, demands for dry foods made of dried vegetables and fruits are increasing. For example, tomatoes are one of the most consumed foods in daily life, so it is natural that there are a lot of demands for dry tomatoes of good quality.

In such circumstances, conventional dry tomatoes, either dried tomatoes or semi-dried tomatoes, are produced by a drying treatment of cut tomatoes, the main bodies of which have been cut in half, in one-sixth, or such a portion, in order to accelerate drying during the production process.

DISCLOSURE OF INVENTION

However, dry tomatoes produced in the above-mentioned manner involve a problem in that not only the form is limited to the cut type but also the appearance is unfavorable. In addition, as the cut faces are exposed, another problem is that the original flavor of the tomato is lost in the drying treatment.

Moreover, in order to solve such a problem, for example, if such a drying treatment is performed without cutting the main bodies of the tomatoes, another problem arises in that the drying takes a long time. Furthermore, as the pericarp and the epidermis have different rates of shrinkage, the produced dry tomatoes have their epidermises exfoliated from the pericarps and thus end up with a quite unfavorable texture, which is also a problem.

The present invention addresses the above-mentioned situations, with an object of providing dry tomatoes having excellent texture, flavor, and appearance, as well as being readily producible, and providing processed tomatoes suitable as a raw material for producing such dry tomatoes.

In order to achieve the above-mentioned object, the following solutions are provided.

A first aspect of the invention is a method of producing a processed tomato having removing a portion of a cuticular layer, together with or without a portion of an epidermal tissue, by laser irradiation on a tomato surface.

A second aspect of the invention is a method of producing a processed tomato having removing a portion of a cuticular layer of a tomato, the main body of which is not cut.

A third aspect of the invention is a method of producing a processed tomato having removing a portion of a cuticular layer of a tomato together with a portion of an epidermal tissue, the main body of which is not cut, while preventing leakage of fruit juice to the surface.

A fourth aspect of the invention is a method of producing a processed tomato according to the second or third aspect, wherein the removal is performed by laser irradiation on a tomato surface.

A fifth aspect of the invention is a method of producing a processed tomato according to the fourth aspect, wherein a portion of a cuticular layer of a tomato is drilled in a dot pattern by laser irradiation from the tomato surface side within a range of laser irradiation, or a portion of a cuticular layer of a tomato is drilled in a dot pattern by laser irradiation together with a portion of an epidermal tissue from the tomato surface side within a range of laser irradiation, and the shortest distance between adjacent drilled holes is shorter than 8 mm.

A sixth aspect of the invention is a method of producing a processed tomato according to the fourth aspect, wherein a portion of a cuticular layer of a tomato is cut to form a grid pattern by laser irradiation from the tomato surface side within a range of laser irradiation, or a portion of a cuticular layer of a tomato is cut to form a grid pattern by laser irradiation together with a portion of an epidermal tissue from the tomato surface side within a range of laser irradiation, and the shortest distance between lines which forms a grid is shorter than 20 mm.

A seventh aspect of the invention is a method of producing a processed tomato according to the sixth aspect, wherein the laser irradiation is performed under a condition where the wavelength is 10.6 μM, the average power output is 12 to 30 W, and the surface pass rate is 500 mm/s.

An eighth aspect of the invention is a method of producing a processed tomato according to the seventh aspect, wherein the laser irradiation is performed under a condition where the average power output is 18 to 30 W.

A ninth aspect of the invention is a method of producing a processed tomato according to any one of the fifth to eighth aspects, wherein the area of the laser irradiation range accounts for 60% or greater of the tomato surface area.

A tenth aspect of the invention is a method of producing a dry tomato having producing a processed tomato by the production method according to any one of the first to ninth aspects, and thereafter drying the processed tomato.

An eleventh aspect of the invention is a processed tomato wherein a portion of a cuticular layer, together with or without a portion of an epidermal tissue, has been removed.

A twelfth aspect of the invention is a processed tomato according to the eleventh aspect, wherein the removal is performed by laser irradiation.

A thirteenth aspect of the invention is a dry tomato produced by drying the processed tomato according to either the eleventh or twelfth aspect.

A fourteenth aspect of the invention is a dry tomato according to the thirteenth aspect, wherein the main body is not cut.

According to the present invention, dry tomatoes having an excellent texture, keeping the original flavor, and having an excellent appearance, as well as being readily producible, can be obtained. In addition, processed tomatoes suitable as a raw material for producing such dry tomatoes can be obtained.

BEST MODE FOR CARRYING OUT THE INVENTION

Figure 1:
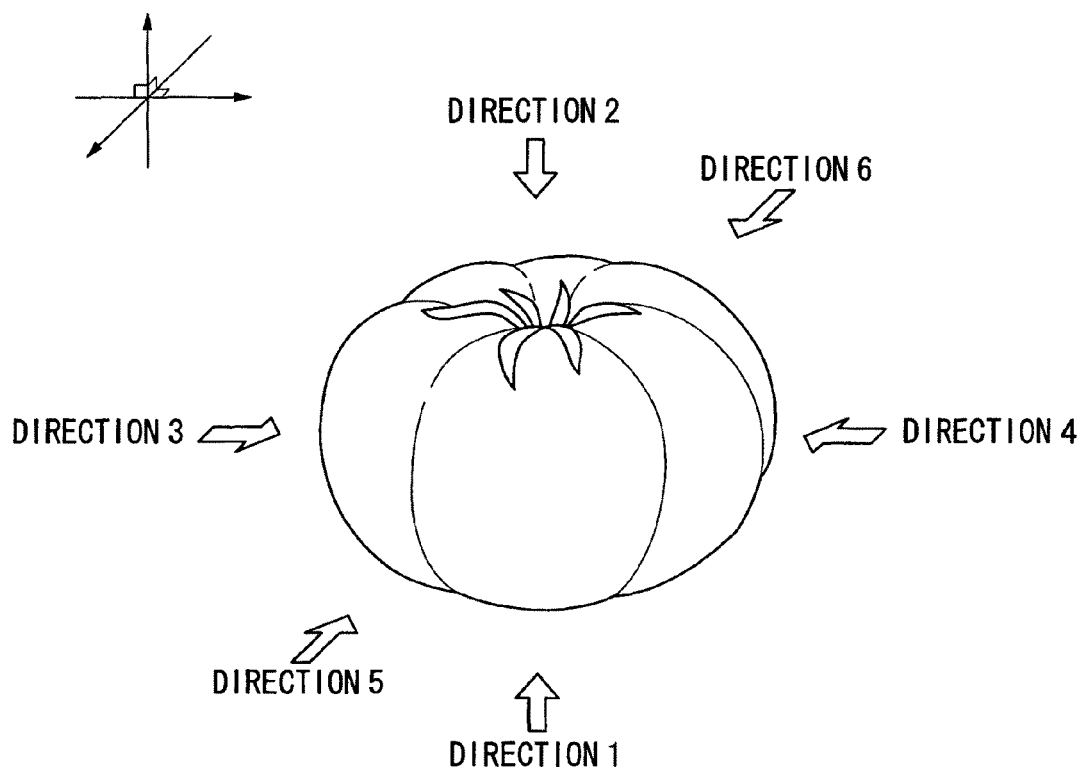
FIG. 1 illustrates direction of irradiation faces when a tomato is irradiated with laser light in Examples.

Hereunder is a detailed description of the present invention.

Processed Tomato and Method of Producing the Same

The processed tomato of the present invention is characterized in that a portion of a cuticular layer, together with or without a portion of an epidermal tissue, has been removed.

A tomato usually has a cuticular layer, epidermal cells, and pericarp cells, sequentially in this order from the surface side.

The processed tomato of the present invention is preferably produced by removing at least a portion of a cuticular layer, together with or without at least a portion of an epidermal tissue, in a portion of a tomato surface, from the surface side toward the epidermal tissue side where the epidermal cells reside. Upon the removal of the epidermal tissue from the surface side, the cuticular layer contacting to the epidermal tissue can not be left remaining on the tomato, and therefore the cuticular layer contacting to the epidermal tissue is to be inevitably removed.

The processed tomato is particularly preferably produced by subjecting a tomato, whose main body is not cut, to the abovementioned process. The dry tomato produced by drying such a processed tomato will have excellent appearance and texture, as the exfoliation of the epidermis from the pericarp can be prevented. Moreover, such a dry tomato can keep the original flavor of the tomato because the pericarp is not exposed.

The removal of the cuticular layer and the epidermal tissue may be performed by any method as long as the purpose can be achieved. However, when the epidermal tissue is to be removed, the method is preferably capable of preventing any leakage of fruit juice to the tomato surface. A processed tomato having no leakage of fruit juice to the tomato surface is suitable as a raw material for producing a dry tomato. This can be attributed to efficient dehydration at the time of drying, because fruit juice leaking from the processed part would not cover the processed part of the tomato surface.

The removal of the cuticular layer and the epidermal tissue is particularly preferably performed by laser irradiation on the tomato surface. By so doing, the removal of the cuticular layer and the epidermal tissue can be precisely controlled and the leakage of fruit juice can be readily prevented when the epidermal tissue is removed.

The laser source is not specifically limited, and any known laser source may be appropriately selected and employed. Specific examples thereof can include: He—Ne, He—Xe, Ar, He—Cd, $CO_2$, Cu vapor, Hg vapor, and such gas lasers; ruby and such solid state lasers; dye lasers; free electron lasers; and semiconductor lasers. Of these, a $CO_2$ laser is suitable.

It can be assumed that, when the cuticular layer and the epidermal tissue are irradiated with laser light, these layer and tissue at the irradiated site are burned and removed, creating a burned surface capable of preventing any leakage of fruit juice, which might contribute to the efficient dehydration at the time of drying. On the other hand, a processed part made by, for example, pricking with a needle-like tool, or cutting open with a bladed tool, is different from the processed part of the processed tomato of the present invention because in the former case the cuticular layer and the epidermal tissue are merely divided into pieces and are not removed. It can be assumed that, if these are merely divided into pieces in such a manner, the processed part may be clogged or fruit juice leaking from the processed part in the epidermal tissue may cover up the processed part of the tomato surface, resulting in inhibition of the dehydration at the time of drying.

Hereunder is a description of the processed tomato suitable as a raw material for producing a dry tomato.

The processed tomato of the present invention is preferably produced by drilling the cuticular layer and the epidermal tissue from the tomato surface side, in a dot pattern, or cutting linearly the same.

If the cuticular layer and the epidermal tissue are drilled in a dot pattern, the distance between adjacent drilled holes is preferably set within a predetermined range.

Moreover, if the cuticular layer and the epidermal tissue are cut linearly, the resulting processed tomato would have a surface in which, for example, adjacent linear cuts are arranged approximately in parallel, or linear cuts are arranged to cross each other. In addition, if cut linearly, the shape of each cut can take various forms such as a segment-like form, a ring form, a spiral form, and a swirl form, as a whole. Of these, it is preferable in the present invention to cut linearly to form a grid. In addition, if cut linearly, the distance between adjacent linear cut portions is preferably set within a predetermined range.

By setting the distance between adjacent drilled holes in a dot pattern or between adjacent linear cut portions within a predetermined range in this way, the drying efficiency of the processed tomato can be improved and the exfoliation of the epidermis from the pericarp in the dry tomato can be more prevented.

It is particularly preferable to perform such a process by means of laser irradiation within a range of laser irradiation, as it offers accurate and easy handling.

If the cuticular layer and the epidermal tissue are drilled in a dot pattern, the shortest distance between adjacent drilled holes is preferably shorter than 8 mm, and more preferably shorter than 3 mm. The minimum length of the shortest distance is not specifically limited.

If the cuticular layer and the epidermal tissue are cut linearly, the shortest distance between adjacent linear cut portions is preferably shorter than 20 mm, and more preferably shorter than 9 mm. Particularly, if cut linearly to form a grid, the shortest distance between adjacent grid lines is preferably shorter than 20 mm, and more preferably shorter than 9 mm. The minimum length of the shortest distance is not specifically limited.

The laser irradiation condition may be appropriately set according to the purpose.

For example, the depth of the processed part from the tomato surface can be adjusted through adjustments of the laser power output, the irradiation time, the surface pass rate, and the like. Thereafter, it is preferable to adjust any one or more of these values so as to create a desired depth. Usually, a deeper depth of the processed part brings better improvement in the drying efficiency of the processed tomato. Thus, the deepest area of the processed part may pierce the epidermal tissue and reach into the layer where the pericarp cells reside, although it is possible to dry sufficiently only by removing a portion of the cuticular layer.

Specifically, the standard depth of the processed part can be set at about 1 to 5 μM if the cuticular layer is to be pierced, and about 20 to 50 μm if the epidermal tissue is to be pierced.

As a specific example, for example, if the cuticular layer and the epidermal tissue are drilled in a dot pattern, or linearly cut, as mentioned above, and if the wavelength is set at 10.6 μm and the surface pass rate is set at 500 mm/s as the laser irradiation condition, it is preferable to set the minimum value of the average power output at 12 W or greater, and more preferably at 18 W or greater. The maximum value of the average power output is not specifically limited as long as the effect of the present invention is not impaired, although 30 W is enough. The irradiation time can be set at discretion so that drilled holes or cut portions can be created as desired.

It is preferable to provide a large number of processed parts in the tomato surface. In a site where processed parts are sparsely present in the tomato surface, the drying efficiency is low and the epidermis is likely to exfoliate from the pericarp as it gets dried. On the other hand, in a site where processed parts are densely present, the drying efficiency is high and the epidermis is unlikely to exfoliate from the pericarp as it gets dried.

Specifically, for example, if a tomato is processed by laser irradiation, the area of the laser irradiation range is preferably set to account for 60% or greater of the tomato surface area, more preferably 80% or greater, particularly preferably 90% or greater, and most preferably 100% or greater. In addition, if a tomato surface is irradiated with laser light from a plurality of directions, the irradiation ranges may be overlapped.

Moreover, it is preferable to create processed parts over a wide range of the tomato surface. Provided that the number of processed parts is the same, if they are created in a wider range, the processed tomato can be more uniformly dried, and a dry tomato having a better state of dryness can be obtained.

If the tomato surface is subjected to laser irradiation, the number of irradiation sources may be either singular or plural.

It is preferable to make variations of either one, or both, of the position and the irradiation direction of irradiation source(s), and it is preferable to make variations of either one, or both, of the position and the orientation of a tomato. More specifically, for example, the irradiation is preferably done by a combination of any one of plans (a) to (c) for the irradiation source:
(a) to change the irradiation direction without changing the position of irradiation source(s);
(b) to change the position without changing the irradiation direction of irradiation source(s);
(c) to change both the position and the irradiation direction of irradiation source(s);
and any one of the plans (d) to (f) for a tomato:
(d) to change the orientation without changing the position of a tomato;
(e) to change the position without changing the orientation of a tomato;
(f) to change both the position and the orientation of a tomato.

Of these, the plan (f) is preferably employed for a tomato at least. For example, a method of irradiating laser light on rolling tomatoes is one of the most convenient and inexpensive methods, and is one of the most suitable methods for the mass production of processed tomatoes in a production line.

If the plan (a) is employed for the irradiation source, the focal point of laser light might be displaced to some slight extent depending on the irradiated site, even within the same irradiation range, because the tomato surface is curved. This is apt to occur particularly when neither the position nor the orientation of a tomato is changed. Accordingly, even under the same irradiation conditions, the depth of a processed part may be deeper at a site close to the irradiation source, and the depth of a processed part may be shallower at a site apart from the irradiation source, within the irradiation range of the tomato surface. Although it is possible in such a situation to obtain a dry tomato having an excellent state of dryness, it is preferable to also change the position of the irradiation source, if the depth of processed parts is desired to be uniformized more.

Dry Tomato and Method of Producing the Same

The dry tomato of the present invention is characterized in being produced by drying the processed tomato of the present invention mentioned above. That is, this can be obtained by producing a processed tomato in the above-mentioned method, and thereafter drying the processed tomato.

The drying method is not specifically limited, and may be appropriately selected among known methods according to the form of the processed tomato. Specific examples thereof can include: natural drying methods such as drying in the sun or in the shade; drying methods by means of a hot air dryer such as a through-air dryer, a rotary dryer, or a tunnel dryer; or drying methods by means of other types of dryer such as a far-infrared dryer and a vacuum dryer.

The drying condition may be appropriately adjusted according to the size of the processed tomato, or the drying method.

For example, in a case where a processed tomato made from a middle-sized tomato having a diameter of about 3 cm to 8 cm is to be dried by means of a variety of drier, the drying temperature is preferably from 30 to 80° C., more preferably from 40 to 75° C., and particularly preferably from 50 to 70° C. The drying time can be set according to the drying temperature. However, if the drying temperature is within such a preferable range as mentioned above, the drying time is preferably from 5 to 70 hours, more preferably from 10 to 60 hours, and particularly preferably from 12 to 48 hours.

For example, in cases where the drying efficiency is considered to be somewhat inferior, like a case where the number of the processed parts in the tomato surface is small or a case where the processed parts are disproportioned to a certain region of the tomato surface, it is preferable to perform drying under a mild condition, for example, by setting a slightly lower drying temperature and setting a longer drying time, because the exfoliation of the epidermis from the pericarp can be prevented.

In addition, for a processed tomato made from a small-sized tomato having a diameter of 3 cm or smaller, it is preferable to dry them under a milder condition than the case of a processed tomato made from a middle-sized tomato; while for a processed tomato made from a large-sized tomato having a diameter of 8 cm or larger, it is preferable to dry them under a severer condition than the case of the processed tomato made from a middle-sized tomato.

The dry tomato of the present invention has an excellent texture, as the exfoliation of the epidermis from the pericarp can be prevented. In addition, in the production process thereof, there is no need of cutting the main body of a tomato before subjecting it to drying, and because of this the form of the tomato will not be limited, and the resulting dry tomato will have an excellent appearance while keeping the original flavor of the tomato. Moreover, such a dry tomato is readily producible, because, for example, it can be dried in a short time. The processed tomato of the present invention is suitable for producing such a dry tomato.

EXAMPLES

Hereunder is a more detailed description of the present invention with reference to specific Examples. However, the present invention is in no way limited to the following Examples.

The term "number of irradiation faces" used in the following Examples refers to the number of irradiation faces in a tomato surface when laser light is irradiated on a tomato from at least any one of a total of six directions as shown in FIG. 1 where mutually and approximately orthogonal three axes are provided and two approximately parallel and opposite directions are determined per each axis. Moreover, an irradiation face in the tomato surface created when laser light is irradiated from the direction 1 is referred to as an irradiation face 1, and irradiation faces created when laser light is irradiated from the directions 2 to 6 are referred to as irradiation faces 2 to 6 in the same manner. The directions 1 and 2 are approximately parallel with each other, the directions 3 and 4 are approximately parallel with each other, and the directions 5 and 6 are approximately parallel with each other.

The case where the number of irradiation faces is six means a case where the irradiation faces 1 to 6 are created, and the total area of these irradiation faces roughly accounts for 100% of the tomato surface area.

The case where the number of irradiation faces is four means a case where the irradiation faces 1 to 4 are created, and the total area of these irradiation faces roughly accounts for 67% of the tomato surface area.

The case where the number of irradiation faces is two means a case where the irradiation faces 1 to 2 are created, and the total area of these irradiation faces roughly accounts for 33% of the tomato surface area.

The case where the number of irradiation faces is one means a case where the irradiation face 1 is created, and the total area of this irradiation face roughly accounts for 17% of the tomato surface area.

Moreover, the term "number of process faces" means the number of process faces in the tomato surface made by performing a needle perforation process, instead of laser irradiation, under the above-mentioned provision.

Examples 1 to 5 and Comparative Examples 1 to 3

Commercial tomatoes (diameter of about 6 to 7 cm) were subjected to either laser irradiation (Examples 1 to 5) or needle perforation (Comparative Examples 2 and 3) under respective conditions as shown in Table 1. The thus produced processed tomatoes and unprocessed tomatoes (Comparative Example 1) were dried. Upon the laser irradiation, the irradiation direction was changed without changing the position of the irradiation source (that is, "plan (a)" mentioned above), and both the position and the orientation of tomatoes were changed (that is, "plan (f)" mentioned above). The same plans were applied to Test Examples that will be described later.

A 3-Axis $CO_2$ laser marker ML-Z9500 (manufactured by Keyence Corporation) was used for the laser irradiation. Moreover, the needle perforation was performed all over the surface at 2 mm intervals. Ten tomatoes were used in Examples 1 to 3, and five tomatoes were used in Examples 4 and 5 and Comparative Examples 1 to 3.

Figure 2:
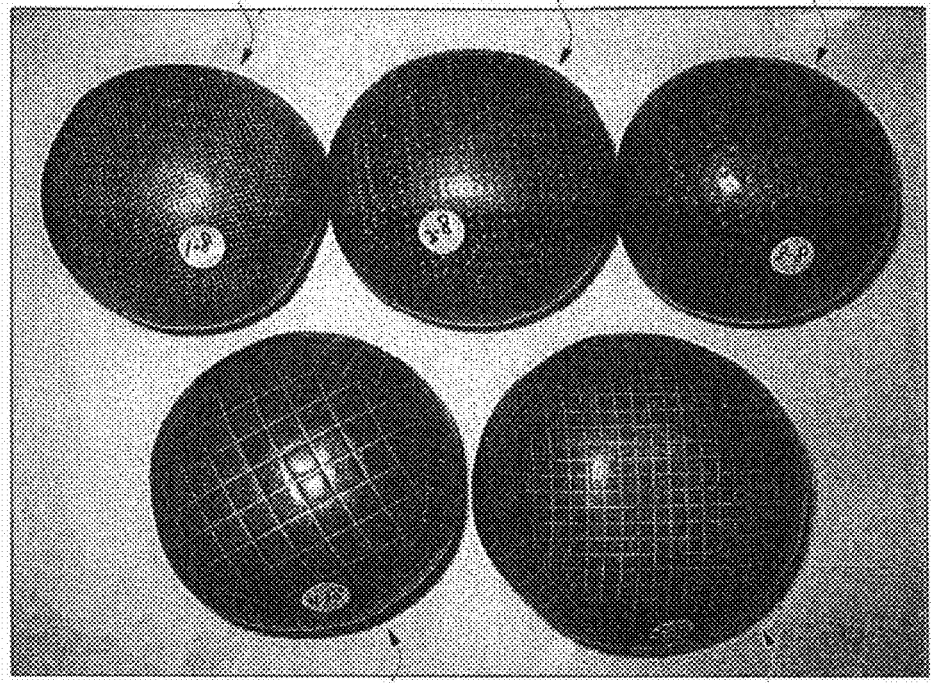
FIG. 2 is an image showing examples of processed tomatoes obtained from Examples 1 to 5.

The laser irradiation condition was set such that the wavelength was 10.6 and the average power output was 18 W. The other conditions were set as in Table 1. The tomato surface pass rate of laser light was set 500 mm/s for both cases of drilling in a dot pattern and cutting linearly to form a grid (grid pattern). FIG. 2 is an image showing examples of processed tomatoes obtained from Examples 1 to 5.

Figure 3:
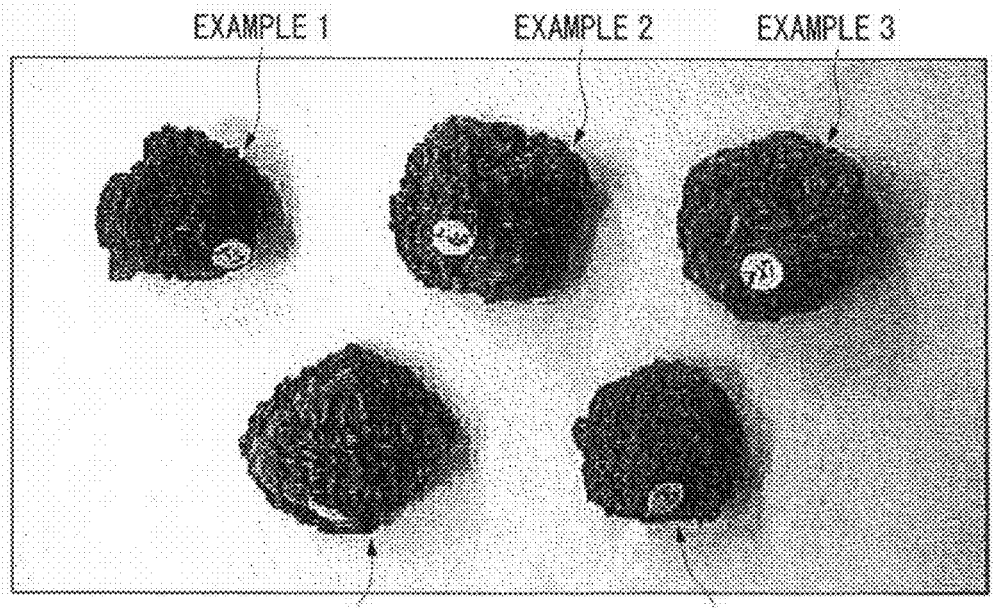
FIG. 3 is an image showing examples of dry tomatoes obtained from Examples 1 to 5.

These processed tomatoes and unprocessed tomatoes were dried by using a high temperature through-air dryer STER-ILIZER KPV-211 (manufactured by ESPEC Corporation) under a condition of 60° C. for 42 hours. FIG. 3 shows an image of examples of dry tomatoes obtained from Examples 1 to 5.

The obtained dry tomatoes were evaluated for the degree of dryness in terms of the mass ratio, and for the degree of epidermal exfoliation from the pericarp (appearance) by visual check. The evaluation results are shown in Table 1.

The mass ratio was defined to be Mass weight after drying/Mass weight before drying×100(%).

The appearance was evaluated by visual check of two experimenters. The evaluation criteria were such that: "○ (Very Good)" stands for those showing no epidermal exfoliation; "Δ (Good)" stands for those showing epidermal exfoliation in some parts of the surface; and "X (Poor)" stands for those showing epidermal exfoliation in most parts of the surface (roughly 50% or more).

TABLE 1

| | | Laser irradiation condition | | Drying condition | | | |
|---|---|---|---|---|---|---|---|
| | Processed part | Interval (mm) | Number of irradiation faces | Temperature (° C.) | Time (hour) | Mass ratio (%) | Appearance evaluation |
| Example 1 | Dot pattern | 1 | 6 | 60 | 42 | 7.3 ± 0.5 | ○ (Very Good) |
| Example 2 | Dot pattern | 2 | 6 | | | 10.7 ± 3.1 | ○ (Very Good) |
| Example 3 | Dot pattern | 3 | 6 | | | 35.3 ± 5.5 | Δ (Good) |
| Example 4 | Grid pattern | 3 | 6 | | | 11.6 ± 1.6 | ○ (Very Good) |
| Example 5 | Grid pattern | 6 | 6 | | | 10.5 ± 1.4 | Δ (Good) |

| | Processing condition | | Drying condition | | | |
|---|---|---|---|---|---|---|
| | Processing method | Number of process faces | Temperature (° C.) | Time (hour) | Mass ratio (%) | Appearance evaluation |
| Comparative Example 1 | Unprocessed | | 60 | 42 | 54.6 ± 15.7 | X (Poor) |
| Comparative Example 2 | Needle perforation (depth: 5 mm) | 6 | | | 49.4 ± 7.9 | X (Poor) |
| Comparative Example 3 | Needle perforation (depth: 0.2 mm) | 6 | | | 44.5 ± 5.7 | X (Poor) |

As shown in Table 1 and FIG. 3, Examples 1 to 5 were able to produce whole dry tomatoes having a high degree of dryness and little epidermal exfoliation, which were excellent as commercial products.

On the other hand, in Comparative Example 1, the resulting tomatoes showed a low degree of dryness and notable epidermal exfoliation, and were not acceptable dry tomatoes as commercial products.

Moreover, in Comparative Examples 1 to 3, fruit juice leaking from the needle-made perforations was coagulated in the tomato surface. Therefore, the resulting tomatoes showed insufficient progress of drying and notable epidermal exfoliation, and were not acceptable dry tomatoes as commercial products.

Test Examples 1 to 5

Figure 4:
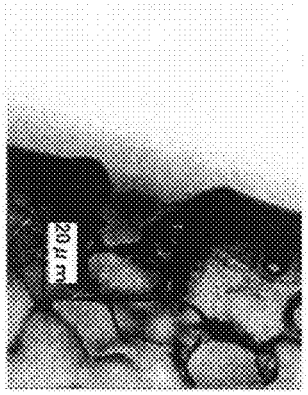
FIG. 4 shows observation images of Test Examples 1 to 5.
Figure 4:
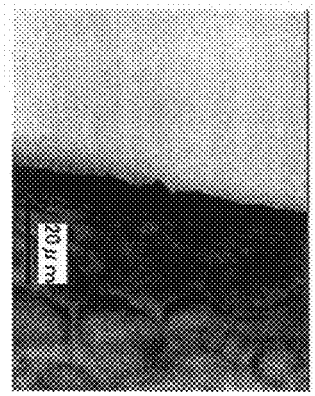
Figure 4:
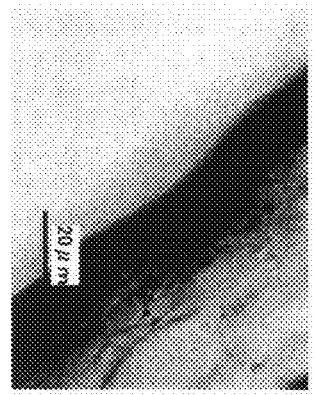
Figure 4:
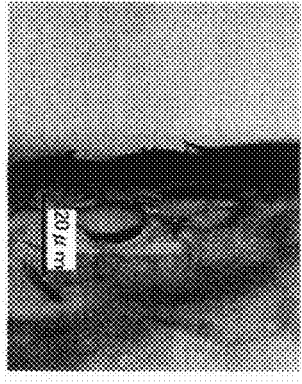
Figure 4:
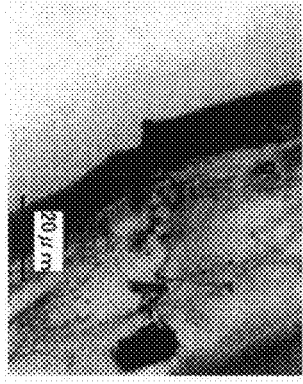

As shown in Table 2, tomatoes processed in the same manner as those of Examples 2 and 4 were used. The epidermal tissue was cut with a scalpel in a thickness of about 0.5 mm in the center and the periphery of the laser irradiation face, and the cut face was observed with an optical microscope (Test Examples 1 to 4). Moreover, tomatoes perforated with a needle in a depth of about 50 to 500 μm were also used. The epidermal tissue of the perforated site was cut with a scalpel in a thickness of about 0.5 mm, and the cut face was observed with an optical microscope (Test Example 5). FIG. 4 shows examples of the observation images.

TABLE 2

| | Laser irradiation condition | | |
|---|---|---|---|
| | Processed part | Interval (mm) | Observation site |
| Test Example 1 | Dot pattern | 2 | Center of irradiation |
| Test Example 2 | Dot pattern | 2 | Periphery of irradiation |
| Test Example 3 | Grid pattern | 3 | Center of irradiation |
| Test Example 4 | Grid pattern | 3 | Periphery of irradiation |
| | Processing condition | | Observation site |
| Test Example 5 | Needle perforation (depth: 50 to 500 μm) | | Processed part |

As shown in FIG. 4, in Test Example 1, drilled holes made by laser irradiation pierced the epidermal tissue and reached the pericarp cells, and the depth of the processed part was about 20 to 50 μm. In Test Example 2, the epidermal tissue or the cuticular layer was only slightly shaved, and the depth of the processed part was about 1 to 5 μm. In this way, when drilled in a dot pattern, the depth of the processed part varied depending on the irradiated site, even in the same laser irradiation face. This was attributed to the fact that the tomato surface is curved.

On the other hand, in Test Example 3 and Test Example 4, the depths of the processed parts were approximately the same at about 1 to 5 μm, and the epidermal tissue or the cuticular layer was only slightly shaved. That is, when cut linearly to form a grid (grid pattern), the depth of the processed part showed no distinct difference between the irradiated sites.

In contrast, in Test Example 5, the processed part pierced the epidermal tissue and reached the pericarp cells. However, the perforation was clogged, and there was no open space.

Since processed tomatoes of Test Examples 1 to 4 yielded excellent quality dry tomatoes and processed tomatoes of Test Example 5 were not able to yield acceptable dry tomatoes as commercial products, it was considered to be important to ensure a sufficient progress of drying by removing the cuticular layer and the epidermal tissue in the processed part and by avoiding any clogging in the processed part.

Test Examples 6 to 9

Commercial tomatoes (diameter of about 6 to 7 cm) were subjected to laser irradiation under respective conditions as shown in Table 3, and dried.

The 3-Axis $CO_2$ laser marker ML-Z9500 (manufactured by Keyence Corporation) was used for the laser irradiation. Moreover, two tomatoes were used in Test Example 6 to 9.

The laser irradiation condition was set such that the wavelength was 10.6 μm, the average power output was 18 W, and the tomato surface pass rate was 500 mm/s. The other conditions were set as in Table 3.

The processed tomatoes were dried by using a high temperature through-air dryer STERILIZER KPV-211 (manufactured by ESPEC Corporation) under a condition of 60° C. for 15 hours.

The obtained dry tomatoes were evaluated for the mass ratio and the appearance in the same manner as that of Examples 1 to 5. The evaluation results are shown in Table 3.

TABLE 3

| | Laser irradiation condition | | | Drying condition | | | |
|---|---|---|---|---|---|---|---|
| | Processed part | Interval (mm) | Number of irradiation faces | Temperature (° C.) | Time (hour) | Mass ratio (%) | Appearance evaluation |
| Test Example 6 | Dot pattern | 3 | 6 | 60 | 15 | 58.0 ± 7.4 | ○ (Very Good) |
| Test Example 7 | Dot pattern | 3 | 4 | | | 62.0 ± 1.5 | Δ (Good) |
| Test Example 8 | Dot pattern | 3 | 2 | | | 63.0 ± 3.3 | X (Poor) |
| Test Example 9 | Dot pattern | 3 | 1 | | | 68.5 ± 3.4 | X (Poor) |

As shown in Table 3, when the number of irradiation faces was one or two, most parts of the dry tomato surfaces showed epidermal exfoliation, and such dry tomatoes were unfavorable as commercial products.

On the other hand, when the number of irradiation faces was six, no epidermal exfoliation was found and such dry tomatoes were favorable as commercial products. Moreover, when the number of irradiation faces was four, epidermal exfoliation occurred in some parts of the surfaces around non-laser irradiated regions in the dry tomato surfaces, although such dry tomatoes were within an acceptable range as commercial products.

Test Examples 10 to 37

As shown in Tables 4 and 5, tomatoes were subjected to laser irradiation and dried in the same manner as those of Examples 1 to 5 to produce dry tomatoes (Test Examples 10 to 18 and Test Examples 20 to 36). Moreover, as comparative controls (standards), unprocessed tomatoes were also dried in the same manner (Test Examples 19 and 37). Ten tomatoes were used in Test Examples 10 to 19, and five tomatoes were used in Test Examples 20 to 37.

The obtained dry tomatoes were evaluated for the state of dryness by calculating the mass ratio in the same manner as that of Examples 1 to 5, and by comparing the mass ratios of dry tomatoes of Test Example 10 to 18 with the mass ratio of dry tomatoes of Test Example 19, in such a way that: "○ (Very Good)" stands for those showing a mass ratio of less than 25% and a significant difference at a significance level of less than 1%; "Δ (Good)" stands for those showing a mass ratio of 25% or more, and a significant difference at a significance level of less than 1%; and "X (Poor)" stands for those showing no significant difference at a significance level of less than 1%.

Moreover, in the appearance evaluation, eighteen experimenters (male: 10, female: 8) were employed as evaluators. They visually checked respective dry tomatoes, and scored under the following criteria. The average value was calculated and the evaluation was performed in such a way that: "○ (Very Good)" stands for those scored 3 or more points; "Δ (Good)" stands for those scored 2 points or more but less than 3 points; and "X (Poor)" stands for those scored less than 2 points.

5 points: Showing no epidermal exfoliation and suitable as commercial products.
4 points: Evaluated as between 5 points and 3 points.
3 points: Showing some epidermal exfoliation but acceptable as commercial products.
2 points: Evaluated as between 3 points and 1 point.
1 point: Showing severe epidermal exfoliation and not suitable as commercial products.

In the overall evaluation, the results of the dryness state evaluation and the appearance evaluation were taken into account. The criteria was such that: "○ (Very Good)" stands for those evaluated as "○ (Very Good)" in either one of the dryness state evaluation and the appearance evaluation; "Δ (Good)" stands for those not evaluated as "○ (Very Good)" in both the dryness state evaluation and the appearance evaluation, but evaluated as "Δ (Good)" in either one of them; and "X (Poor)" stands for those neither evaluated as "○ (Very Good)" nor "Δ (Good)" in both the dryness state evaluation and the appearance evaluation.

The respective evaluation results are shown in Table 4 and Table 5.

TABLE 4

| | Laser irradiation condition | | | Drying condition | | State of dryness | | | Appearance | | |
|---|---|---|---|---|---|---|---|---|---|---|---|
| | Processed part | Interval (mm) | Number of irradiation faces | Temperature (°C.) | Time (hour) | Mass ratio | Significant difference (p < 0.01) | Evaluation | Sensory score | Evaluation | Overall evaluation |
| Test Example 10 | Dot pattern | 1 | 6 | 60 | 42 | 7.3 ± 0.5 | Present | ○ (Very Good) | 4.8 ± 0.5 | ○ (Very Good) | ○ (Very Good) |
| Test Example 11 | Dot pattern | 2 | 6 | | | 10.7 ± 3.1 | Present | ○ (Very Good) | 4.7 ± 0.7 | ○ (Very Good) | ○ (Very Good) |
| Test Example 12 | Dot pattern | 3 | 6 | | | 35.3 ± 5.5 | Present | Δ (Good) | 1.1 ± 0.2 | X (Poor) | Δ (Good) |
| Test Example 13 | Dot pattern | 4 | 6 | | | 37.7 ± 8.0 | Present | Δ (Good) | 1.2 ± 0.7 | X (Poor) | Δ (Good) |
| Test Example 14 | Dot pattern | 5 | 6 | | | 46.9 ± 7.2 | Present | Δ (Good) | 1.0 ± 0.0 | X (Poor) | Δ (Good) |
| Test Example 15 | Dot pattern | 6 | 6 | | | 45.3 ± 5.2 | Present | Δ (Good) | — | — | Δ (Good) |
| Test Example 16 | Dot pattern | 7 | 6 | | | 44.7 ± 7.6 | Present | Δ (Good) | — | — | Δ (Good) |
| Test Example 17 | Dot pattern | 8 | 6 | | | 50.4 ± 7.1 | Absent | X (Poor) | — | — | X (Poor) |
| Test Example 18 | Dot pattern | 9 | 6 | | | 48.6 ± 1.9 | Absent | X (Poor) | — | — | X (Poor) |
| Test Example 19 | — | — | — | | | 50.6 ± 7.2 | Standard | X (Poor) | — | — | X (Poor) |

TABLE 5

| | Laser irradiation condition | | | Drying condition | | State of dryness | | | Appearance | | |
|---|---|---|---|---|---|---|---|---|---|---|---|
| | Processed part | Interval (mm) | Number of irradiation faces | Temperature (°C) | Time (hour) | Mass ratio | Significant difference (p < 0.01) | Evaluation | Sensory score | Evaluation | Overall evaluation |
| Test Example 20 | Grid pattern | 1 | 6 | 60 | 42 | 7.2 ± 0.1 | Present | ○ (Very Good) | 4.3 ± 1.4 | ○ (Very Good) | ○ (Very Good) |
| Test Example 21 | Grid pattern | 2 | 6 | | | 7.4 ± 0.7 | Present | ○ (Very Good) | 4.4 ± 1.3 | ○ (Very Good) | ○ (Very Good) |
| Test Example 22 | Grid pattern | 3 | 6 | | | 9.5 ± 1.3 | Present | ○ (Very Good) | 4.5 ± 1.0 | ○ (Very Good) | ○ (Very Good) |
| Test Example 23 | Grid pattern | 4 | 6 | | | 11.6 ± 1.6 | Present | ○ (Very Good) | 4.2 ± 1.0 | ○ (Very Good) | ○ (Very Good) |
| Test Example 24 | Grid pattern | 5 | 6 | | | 10.5 ± 1.4 | Present | ○ (Very Good) | 3.7 ± 1.2 | ○ (Very Good) | ○ (Very Good) |
| Test Example 25 | Grid pattern | 6 | 6 | | | 14.0 ± 2.2 | Present | ○ (Very Good) | 3.3 ± 1.0 | ○ (Very Good) | ○ (Very Good) |
| Test Example 26 | Grid pattern | 7 | 6 | | | 17.4 ± 4.4 | Present | ○ (Very Good) | 3.6 ± 1.2 | ○ (Very Good) | ○ (Very Good) |
| Test Example 27 | Grid pattern | 8 | 6 | | | 20.4 ± 4.8 | Present | ○ (Very Good) | 2.6 ± 1.5 | Δ (Good) | ○ (Very Good) |
| Test Example 28 | Grid pattern | 9 | 6 | | | 24.6 ± 3.4 | Present | Δ (Good) | 1.5 ± 0.9 | X (Poor) | Δ (Good) |
| Test Example 29 | Grid pattern | 10 | 6 | | | 29.5 ± 5.4 | Present | Δ (Good) | — | — | Δ (Good) |
| Test Example 30 | Grid pattern | 12 | 6 | | | 32.1 ± 11.5 | Present | Δ (Good) | — | — | Δ (Good) |
| Test Example 31 | Grid pattern | 14 | 6 | | | 34.8 ± 4.1 | Present | Δ (Good) | — | — | Δ (Good) |
| Test Example 32 | Grid pattern | 16 | 6 | | | 34.8 ± 7.7 | Present | Δ (Good) | — | — | Δ (Good) |
| Test Example 33 | Grid pattern | 18 | 6 | | | 42.3 ± 4.6 | Present | Δ (Good) | — | — | Δ (Good) |
| Test Example 34 | Grid pattern | 20 | 6 | | | 42.8 ± 8.4 | Absent | X (Poor) | — | — | X (Poor) |
| Test Example 35 | Grid pattern | 25 | 6 | | | 45.0 ± 10.6 | Absent | X (Poor) | — | — | X (Poor) |
| Test Example 36 | Grid pattern | 30 | 6 | | | 51.9 ± 5.0 | Absent | X (Poor) | — | — | X (Poor) |
| Test Example 37 | — | — | — | | | 54.6 ± 5.8 | Standard | X (Poor) | — | — | X (Poor) |

As shown in Table 4, when processed tomatoes drilled in a dot pattern were used, those having the distance (interval) between adjacent drilled holes of 1 mm or longer and shorter than 8 mm (Test Examples 10 to 16) showed a better state of dryness than those produced from unprocessed tomatoes (Test Example 19). Furthermore, those having the distance (interval) of 1 mm or longer and shorter than 3 mm (Test Examples 10 and 11) were able to produce whole dry tomatoes with the best state of dryness and less epidermal exfoliation, which were favorable as commercial products. Those having the distance (interval) of 3 mm or longer and shorter than 8 mm (Test Examples 12 to 16) showed epidermal exfoliation in most parts of the surfaces. However, this epidermal exfoliation was controllable by adjustments to alleviate the drying condition, and such tomatoes were able to produce whole dry tomatoes which were acceptable as commercial products.

As shown in Table 5, when processed tomatoes linearly cut to form a grid (grid pattern) were used, those having the distance (interval) between adjacent grid lines of 1 mm or longer and shorter than 20 mm (Test Examples 20 to 33) showed a better state of dryness than those produced from unprocessed tomatoes (Test Example 37). Furthermore, those having the distance (interval) of 1 mm or longer and shorter than 9 mm (Test Examples 20 to 27) were able to produce whole dry tomatoes with the best state of dryness and less epidermal exfoliation, which were favorable as commercial products. Those having the distance (interval) of 9 mm or longer and shorter than 20 mm (Test Examples 28 to 33) showed epidermal exfoliation in most parts of the surfaces. However, this epidermal exfoliation was controllable by adjustments to alleviate the drying condition, and such tomatoes were able to produce whole dry tomatoes which were acceptable as commercial products.

Test Examples 38 to 48

Tomatoes were subjected to laser irradiation and dried in the same manner as that of Example 11, except for that the average power output for laser irradiation was set as in Table 6, to produce dry tomatoes (Test Examples 38 to 47). In addition, as a comparative control (standard), unprocessed tomatoes were also dried in the same manner (Test Example 48). Three tomatoes were used in all cases.

The obtained dry tomatoes were evaluated for the state of dryness by calculating the mass ratio in the same manner as that of Example 11. The evaluation results are shown in Table 6.

TABLE 6

| | Laser irradiation condition | | | Drying condition | | State of dryness | | |
|---|---|---|---|---|---|---|---|---|
| | Processed part | Interval (mm) | Number of irradiation faces | Power output (W) | Temperature (° C.) | Time (hour) | Mass ratio | Significant difference ($p < 0.01$) | Evaluation |
| Test Example 38 | Dot pattern | 2 | 6 | 3 | 60 | 42 | 44.53 ± 3.02 | Absent | X (Poor) |
| Test Example 39 | Dot pattern | 2 | 6 | 6 | | | 47.14 ± 7.52 | Absent | X (Poor) |
| Test Example 40 | Dot pattern | 2 | 6 | 9 | | | 38.52 ± 7.32 | Absent | X (Poor) |
| Test Example 41 | Dot pattern | 2 | 6 | 12 | | | 31.76 ± 2.5 | Present | Δ (Good) |
| Test Example 42 | Dot pattern | 2 | 6 | 15 | | | 29.87 ± 1.35 | Present | Δ (Good) |
| Test Example 43 | Dot pattern | 2 | 6 | 18 | | | 24.39 ± 2.67 | Present | ○ (Very Good) |
| Test Example 44 | Dot pattern | 2 | 6 | 21 | | | 17.3 ± 1.55 | Present | ○ (Very Good) |
| Test Example 45 | Dot pattern | 2 | 6 | 24 | | | 13.58 ± 2.06 | Present | ○ (Very Good) |
| Test Example 46 | Dot pattern | 2 | 6 | 27 | | | 10.53 ± 0.66 | Present | ○ (Very Good) |
| Test Example 47 | Dot pattern | 2 | 6 | 30 | | | 11.82 ± 2.74 | Present | ○ (Very Good) |
| Test Example 48 | — | — | — | — | | | 45.45 ± 2.57 | Standard | X (Poor) |

As shown in Table 6, the state of dryness was favorable when the average power output for laser irradiation was from 12 to 30 W, and the most favorable when the average power output was from 18 to 30 W.

INDUSTRIAL APPLICABILITY

The present invention is suitable for long term preservation of tomatoes, and applicable to a wide range of the field of food products, irrespective of commercial or business use.

The invention claimed is:

1. A method of producing a processed tomato, comprising: removing a portion of a cuticular layer of a tomato by irradiating a surface of the tomato with a laser beam to drill the cuticular layer in a dot pattern, or to cut the cuticular layer linearly,
wherein the main body of the tomato is not cut, and
wherein the irradiating is performed over 60% or greater of the surface area of the tomato.

2. The method of claim 1, further comprising removing a portion of epidermal tissue.

3. A method of producing a dry tomato comprising producing a processed tomato by the method of claim 1.

4. The method of claim 1, wherein the shortest distance between adjacent drilled holes is shorter than 8 mm, and the shortest distance between adjacent linearly cut portions is shorter than 20 mm.

5. A method of producing a processed tomato, comprising: removing a portion of a cuticular layer of a tomato and a portion of an epidermal tissue while preventing leakage of fruit juice to a surface of the tomato by irradiating a surface of the tomato with a laser beam to drill the cuticular layer and the epidermal tissue in a dot pattern, or to cut the cuticular layer and the epidermal tissue linearly,
wherein the main body of the tomato is not cut, and
wherein the irradiating is performed over 60% or greater of the surface area of the tomato.

6. A method of producing a dry tomato comprising producing a processed tomato by the method of claim 5.

7. The method of claim 5, wherein the shortest distance between adjacent drilled holes is shorter than 8 mm, and the shortest distance between adjacent linearly cut portions is shorter than 20 mm.

8. A method of producing a processed tomato, comprising:
producing openings in a portion of a cuticular layer of a tomato by irradiating the tomato surface with a laser beam,
wherein the openings are arranged in a dot pattern, wherein the main body of the tomato is not cut, and
further wherein the irradiating is performed over 60% or greater of the surface area of the tomato.

9. The method of claim 8, further including producing openings in a portion of an epidermal tissue of a tomato.

10. The method of claim 8, wherein the shortest distance between the adjacent openings is less than 8 mm.

11. A method of producing a dry tomato comprising producing a processed tomato by the method of claim 8.

12. A method of producing a processed tomato, comprising:
producing cuts in a portion of a cuticular layer of a tomato by irradiating the tomato surface with a laser beam,
wherein the cuts are arranged in a grid pattern,
wherein the main body of the tomato is not cut, and
further wherein the irradiating is performed over 60% or greater of the surface area of the tomato.

13. The method of claim 12, further including producing cuts in a portion of an epidermal tissue of a tomato.

14. The method of claim 12, wherein the shortest distance between the adjacent cuts is less than 20 mm.

15. The method of claim 14, wherein the laser beam wavelength is 10.6 µm, the average power output of the laser is 12 to 30 W, and the surface pass rate of the laser beam is 500 mm/s.

16. The method of claim 15, wherein the average power output of the laser is 18to 30 W.

17. A method of producing a dry tomato comprising producing a processed tomato by the method of claim 12.

* * * * *